United States Patent [19]

Bernard et al.

[11] 4,347,292

[45] Aug. 31, 1982

[54] ELECTRIC CELL ASSEMBLY WITH AN ALKALINE ELECTROLYTE AND CURRENT OUTPUT WIRES

[75] Inventors: Alain Bernard, Pessac; Raymond Bonnaterre, Merignac, both of France

[73] Assignee: Saft-Societe des Accumulateurs Fixes et de Traction, Romainville, France

[21] Appl. No.: 276,981

[22] Filed: Jun. 24, 1981

[30] Foreign Application Priority Data

Jun. 30, 1980 [FR] France .................................. 80 14533

[51] Int. Cl.³ ............................................ H01M 2/32
[52] U.S. Cl. ..................................... 429/65; 429/121; 429/178
[58] Field of Search ................. 429/65, 181, 174, 121, 429/122, 178

[56] References Cited

U.S. PATENT DOCUMENTS

| | | | |
|---|---|---|---|
| 1,050,893 | 1/1913 | Willard | 429/65 |
| 3,064,065 | 11/1962 | Belove | 429/181 |
| 4,122,243 | 10/1978 | Tsuchida et al. | 429/174 |

*Primary Examiner*—Donald L. Walton
*Attorney, Agent, or Firm*—Kenyon & Kenyon

[57] ABSTRACT

The invention relates to an electric cell assembly with an alkaline electrolyte and its current output wires (2, 3) electrically connected to the positive terminal and negative terminal of the electric cell assembly.

The metal wire (3) which corresponds to the negative terminal (1) is surrounded, near said terminal and entirely outside the electric cell, with a glass bead (4) which is practically unalterable by the electrolyte.

3 Claims, 1 Drawing Figure

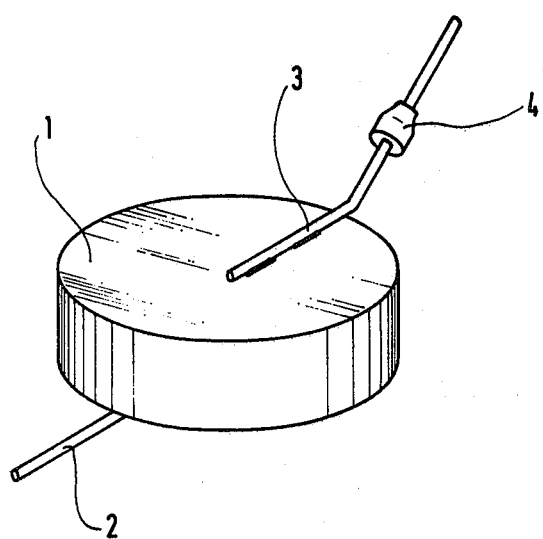

ELECTRIC CELL ASSEMBLY WITH AN ALKALINE ELECTROLYTE AND CURRENT OUTPUT WIRES

The present invention relates to an electric cell assembly having an alkaline electrolyte and current output wires connected to its positive terminal and to its negative terminal. The invention relates more particularly, but not exclusively, to assemblies where the electric cell is small as in the case of button-type cells, for example.

BACKGROUND OF THE INVENTION

When such electric cells are used as a power source in fragile equipment which includes e.g. electronic circuits, it is absolutely essential that their electrolyte does not come into contact with said equipment. It is known that potassium hydroxide which often forms the electrolyte has a particular tendency to creep along negatively polarized metal surfaces. More particularly, in the case of storage cells which not only are active for a longer time than primary cells but which often undergo stresses due to variations in active mass between the charged state and the discharged state, this phenomenon takes place in the long run and the negative current output wire transmits potassium hydroxide from the electric cell to the user equipment. It is possible to take special precautions to reinforce sealing of the electric cells to prevent any leakage of electrolyte even in the long run. However, such precautions naturally increase the cost price of the electric cell greatly.

Preferred embodiments of the present invention mitigate these drawbacks and prevent moderately sealed cells from electrolyte leakage even in the long run.

SUMMARY OF THE INVENTION

The present invention provides an electric cell assembly having an alkaline electrolyte and current output wires electrically connected to the positive terminal and negative terminal of the electric cell assembly, wherein the metal wire which corresponds to the negative terminal is surrounded, near said terminal and entirely outside the electric cell, with a bead made of a glass which is practically unalterable by said electrolyte.

It is observed that any electrolyte which may creep along the negative terminal of the electric cell, then along the current output wire is completely stopped by the glass bead.

To prevent contact between the electrolyte (e.g. potassium hydroxide) and the equipment, the electric cell assembly may be embedded in an insulating polymer material which may either be in compact form or in the form of a foam. It should be observed that the coating is inoperative to stop the potassium hydroxide if a glass bead is not used. This is because potassium hydroxide creeps as well or even better along metal surfaces embedded in an insulating material than it does along metal surfaces in the open air, since the coating protects the potassium hydroxide from being carbonated.

The term "electric cell assembly" is used as a generic term indifferently applicable to primary cells and to secondary cells, and also to such cells used singly or arranged in batteries.

BRIEF DESCRIPTION OF THE DRAWING

The invention will be better understood from the embodiment described hereinafter with reference to the accompanying drawing in which the sole FIGURE is a perspective view of a cell assembly in accordance with the invention.

DESCRIPTION OF PREFERRED EMBODIMENT

Reference 1 designates a button type alkaline nickel-cadmium storage cell, seen from its negative side. It is known that a button-type storage cell has a casing constituted by a cup and a cap, one electrically connected to the positive electrode, the other electrically connected to the negative electrode, and both being insulated from each other by an insulating seal. A metal wire 2 soldered to the positive cup, not shown, of the button-type cell constitutes the positive current output and a metal wire 3 soldered to the negative cap which is shown in the FIGURE, constitutes the negative current output of the storage cell 1. The wire 2 is soldered by any suitable means to the positive cup and the wire 3 is soldered to the negative cap. A glass bead 4 is provided on the wire 3 which it surrounds completely. Such components—wire and glass bead—can be found commercially. There are two types of such components. When the glass which constitutes the bead has a coefficient of thermal expansion identical or very close to that of the wire, which is made of special alloy, e.g. nickel, cobalt and iron, the glass bead can be bare. If this is not the case, the bead is held compressed on the wire by a metal band surrounding the bead.

If electrolyte leakage occurs at the seal, the electrolyte preferentially creeps along the negative cap and reaches the wire 3 along which it also creeps. The glass bead 4 stops the electrolyte which, without it, would reach the equipment to which the storage cell 1 supplies current. Of course, the glass must be chosen to be as resistant as possible to alkalis.

Tests have been made on button-type storage cells undergoing very severe heat cycles, some having glass beads in accordance with the invention, others having no glass beads in accordance with the prior art. To make the tests more convincing and to speed them up, some sealing precautions at the seal were omitted. The assemblies were embedded either in a polyurethane foam or in an epoxy resin, only the ends of the current outputs protruding from the coating.

All the storage cells were subjected to the following weekly heat cycle:

2 days at 60° C.
1 day at ambient temperature
2 days at 60° C.
2 days at ambient temperature.

The negative current outputs of storage cells in accordance with the prior art began to leak one month after the beginning of the tests. After four months, all the storage cells were leaking, with potassium hydroxide getting outside the coating on the negative current output, whereas no leakage occurred at the current outputs of storage cells equipped with the assembly in accordance with the invention.

Of course variants to the above described embodiment can be produced without thereby going beyond the scope of the invention. Thus the assembly, instead of consisting of a button-type storage cell and a negative wire equipped with a glass bead, could consist of a battery of button-type storage cells, the negative current output of the battery as a whole being equipped with a glass bead. The storage cells could be other than button-shaped cells and could alternatively be primary cells. It is not necessary to provide a coating to stop the potassium hydroxide if there is no disadvantage in leaving the negative cap and the wire exposed. However, if a coating is used, polymers other than those of the embodiment described could be used and should preferably be selected from those polymers which withstand potassium hydroxide.

We claim:

1. An electric cell assembly having an alkaline electrolyte and current output wires electrically connected to the positive terminal and negative terminal of the electric cell assembly, wherein the metal wire which corresponds to the negative terminal is surrounded, near said terminal and entirely outside the electric cell, with a bead made of a glass which is practically unalterable by said electrolyte.

2. An assembly according to claim 1, wherein said glass bead is held compressed on said wire by a metal band.

3. An assembly according to either one of claims 1 or 2, wherein the assembly is embedded in an insulating polymer material.

* * * * *